United States Patent
O'Loughlin

[15] 3,675,115
[45] July 4, 1972

[54] POWER SUPPLY PROVIDING SYNCHRONIZED ENERGIZATION OF A LOAD

[72] Inventor: James P. O'Loughlin, Sudbury, Mass.
[73] Assignee: Raytheon Company, Lexington, Mass.
[22] Filed: Nov. 26, 1969
[21] Appl. No.: 880,070

[52] U.S. Cl. .............................. 323/6, 321/2, 323/22 SC, 323/22 T, 323/DIG. 1
[51] Int. Cl. ....................................................... G05f 1/56
[58] Field of Search ................. 321/2, 16, 18; 323/6, 17, 18, 323/22 T, 22 SC, 62, DIG. 1

[56] References Cited

UNITED STATES PATENTS

| 3,400,319 | 9/1968 | Stich | 321/2 |
| 3,365,654 | 1/1968 | Johnston | 323/22 SC |
| 3,404,330 | 10/1968 | Tomota et al. | 321/2 X |
| 3,453,521 | 7/1969 | Schultz et al. | 321/2 |
| 3,515,974 | 6/1970 | Stich | 321/2 |
| 3,375,428 | 3/1968 | Mitchell | 321/18 |
| 3,519,917 | 7/1970 | Martin | 323/22 SC |

Primary Examiner—A. D. Pellinen
Attorney—Philip J. McFarland and Joseph D. Pannone

[57] ABSTRACT

A power supply having an energy storage capacitor for supplying energy at a predetermined voltage to a pulsed load, and a charging circuit operative during recurring intervals between the pulsing of the load and responsive to the magnitude of the voltage supplied to the pulsed load for charging the energy storage capacitor. A transformer is provided in combination with the charging circuit to isolate the energy storage capacitor from the charging circuit during the pulsing of the load.

4 Claims, 1 Drawing Figure

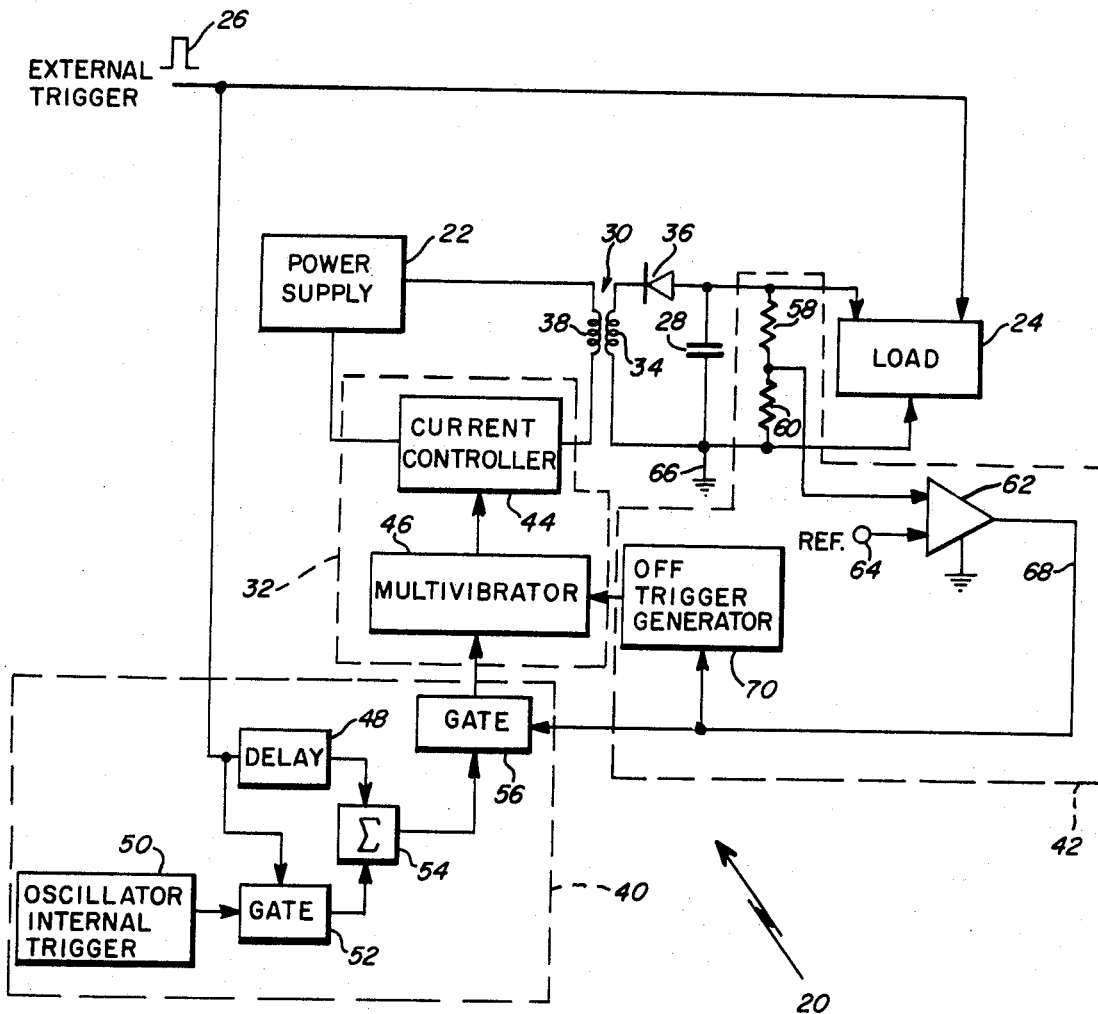
INVENTOR
JAMES P. O'LOUGHLIN 3,675,115

POWER SUPPLY PROVIDING SYNCHRONIZED ENERGIZATION OF A LOAD

The invention herein described was made in the course of or under a contract with the Department of Defense.

BACKGROUND OF THE INVENTION

This invention relates to power supplies and more particularly to a gated voltage source adapted to produce a predetermined voltage.

Power supplies are frequently constructed in the form of a feedback amplifier in which a fraction of the output voltage is compared to a reference voltage, the feedback acting to preserve a fixed relationship between the output and reference voltages. It is to be understood that references to voltage regulation herein apply in an analogous manner to current regulated power supplies. The relationship between the output and the reference voltage is not preserved perfectly, as there is typically a small error which varies in accordance with the manner in which power is drawn by a load connected to the output of the power supply. A sudden drawing of power, as by a pulsed load, induces a transient response by the feedback loop of the power supply such that the output voltage is perturbed with a well-known transient response.

Of particular interest is the situation where a high voltage (10 kilovolts) pulsed travelling wave tube (TWT) or other such transmitting device is utilized as the pulsed load in a radar system. In such a case, the phase characteristic (time dependent variations in the carrier phase) of the transmitter often must be carefully controlled. Variations in the phase characteristic of a transmitting tube, such as a TWT or klystron are directly related to the ripple and regulation of the power supply which energizes the transmitting tube. In view of the aforementioned transients of power supplies in response to pulsed loads, a power supply of the prior art can provide adequate control of its output voltage if it utilizes a large energy storage element, such as a large capacity capacitor. However, such supplies may be so large and heavy as to be impractical in many applications, such as airborne radar systems.

The task of precisely controlling the output voltage of the high voltage power supply is simplified by recognizing that, while generally, in radar applications the transmitted pulses should be identical, the waveform may depart somewhat from such desired shape. That is, for example, the carrier phase within each pulse may depart from a desired value so long as the variation is substantially uniform from pulse to pulse. Such a result is typically caused by a decrease or "droop," in the power supply voltage applied to a control terminal of the transmitting tube during the duration of a transmitted pulse. Accordingly, a power supply which suffers voltage "droop" may generally be utilized with transmitting tubes in radar applications providing that there be some means for ensuring that successive pulses in the transmitted pulse train would be nearly identical.

As an example of a typical prior art high voltage power supply, there is shown in the General Electric SCR Manual, second edition, FIG. 10.6, such a supply utilizing a well-know form of the "Morgan" circuit (comprising a pulsed silicon controlled rectifier) and a voltage step up transformer energized by the Morgan circuit for charging up an output storage capacitor. The pulse repetition frequency of the Morgan circuit is varied automatically to maintain a predetermined output voltage. The circuit is desirable in that it provides a regulated high voltage from a low voltage primary supply and has a physical size and weight similar to that of a low voltage supply. However, this supply is not adapted to be synchronized with a pulsed transmitter load to ensure that voltage droop would be identical during successive pulses in the transmitted pulse train.

With reference to isolation it is interesting to note that while transformer coupling is used in regulated power supplies the circuits are not generally designed for maximum isolation of the output from the charging circuit. For example, in the aforementioned circuit of FIG. 10.6 of the SCR Manual, an element (an inductive filter) is common to both the charging circuit and output sections of the supply, thus providing a path for interference which may be disregarded in most power supply applications. A similar comment applies to the voltage amplitude controller shown in the patent to James, U.S. Pat. No. 3,218,546 which issued Nov. 16, 1965, wherein is disclosed a pair of transformers joined by a variable conductance element. While this device provides continuous control in comparison to the pulsed control of the aforementioned regulators, nevertheless the circuitry does not provide for maximum isolation of the output from the control circuitry. A conducting path is always present between the two transformers (assuming the variable conductance element always has a finite resistance) with the result that a disturbance (such as a momentary change in input voltage magnitude) is transferred to the output. This lack of isolation in the prior art would mitigate against the attainment of the identical voltage droop patterns as are desired for the pulsed transmitting device of a radar system.

Accordingly it is an object of the present invention to provide a high voltage power supply having a physical size and weight of a low voltage power supply.

Another object of the invention is to provide isolation of power supply ripple (such as the well-known 400 Hz ripple present at the output of power supplies utilizing a primary 400 Hz alternating current source of power) from the load while the load is being pulsed.

It is a further object of the invention to provide a high voltage power supply for connection with a pulsed load, such that a voltage droop induced by the load is substantially identical during successive pulses.

SUMMARY OF THE INVENTION

In a power supply having an input for connection with a source of power, and an output including energy storage means for connection with a pulsed load, there is provided a gating means and a transformer for coupling energy from the source of power at a first voltage to the output energy storage means at a second voltage during a first condition and for isolating the energy storage means from the gating means during a second condition, the gating means being in circuit with an input winding of the transformer and the source of power for generating a current pulse in the input winding of the transformer during the first condition and rendering the input winding of the transformer nonconductive during the second condition, syncronizing means responsive to the pulsing of the pulsed load for triggering the gating means normally to generate a current pulse after each pulsing of the load, and sensing means responsive to the magnitude of the second voltage and connecting with the gating means for controlling the duration of each current pulse whereby the energy provided by each current pulse is essentially equal to energy withdrawn by the load from the energy storage means during the second condition.

BRIEF DESCRIPTION OF THE DRAWING

The aforementioned objects and other features of the invention are explained in the following description taken in connection with the accompanying drawing wherein the FIGURE shows in diagrammatic form the regulated power supply of this invention.

DESCRIPTION OF THE PREFERRED EMBODIMENT

Referring now to the FIGURE there is shown a preferred embodiment of the invention, hereinafter referred to as regulator 20, which receives power from an unregulated or "raw" supply of electric power indicated by power source 22. The regulator 20 stores energy in a manner to be described, and thereafter provides power to load 24 which typically comprises a TWT, klystron or other pulsed load which draws energy from the regulator 20 in response to an external trigger 26 provided by conventional means, not shown. Thus, in a typical application for the regulator 20, the load 24 is a radar transmitting tube, and the external trigger 26 is a radar system trigger applied to a control terminal (not shown) of load 24 causing it to produce a pulse of radio frequency energy.

The regulator 20 is provided with energy storage means, herein shown as capacitor 28, whereby energy is stored recurrently during the intervals between the pulsing of load 24 and released to the load 24 during the relatively short time duration of a pulse of load 24. Capacitor 28 is charged to a predetermined voltage magnitude as is required for operation of load 24. For example, if load 24 is a TWT, capacitor 28 is charged to a voltage of typically 10 kilovolts. The charging of capacitor 28 is accomplished by means of transformer 30 and charging gate 32. A secondary winding 34 of transformer 30 is connected via diode 36 to capacitor 28, and a primary winding 38 of transformer 30 is connected via charging gate 32 to power source 22. Charging gate 32 switches a current to generate a pulse of current, preferably of uniform amplitude, which is coupled via transformer 30 to capacitor 28 for restoring such energy to capacitor 28 as was withdrawn by load 24. Charging gate 32 is synchronized to the pulsing of load 24 by synchronizer 40 whereby a charging current pulse is initiated at a fixed time after the occurrence of each external trigger. Thereby the charging of capacitor 28 occurs recurrently during the intervals between the pulsing of load 24. A sensor 42, responsive to the output voltage of regulator 20, or equivalently, the voltage across capacitor 28, triggers the charging gate 32 to terminate the current pulse when the output voltage reaches a predetermined value. Thus, the pulse width, or duration, of the charging current pulse is modulated to restore the output voltage to its predetermined value after each pulsing of the load 24.

Charging gate 32 comprises a controller 44 which is a current source, such as a transistor, and multivibrator 46 which is monostable and has two voltage states such that the controller 44 may be turned "ON" and "OFF." The width of each current pulse provided by charging gate 32 is equal to the duration of the "ON" state of controller 44 and is variable, for example from 5 to 50 microseconds, in accordance with the amount of energy which must be supplied to capacitor 28 to restore the output voltage to its predetermined value.

Transformer 30 serves the dual functions of providing a voltage transformation and isolating capacitor 28 from the controller 44 and the power source 22. Thus, for example, in the situation where a relatively high voltage (10 kilovolts) output is required from a relatively low voltage (250 volts) power source, the transformer 30 is a step up transformer with a turns ratio sufficient to provide the output voltage. The transformer 30 has sufficient bandwidth to couple the current pulses (which, for example, vary from 5 to 50 microseconds) which are generated by the charging gate 32. The configuration of the circuit allows for maximum isolation between the capacitor 28 and the charging gate 32 since the primary winding 38 is in series with controller 44. Thus, when controller 44 is OFF or, equivalently, nonconducting, no current flows in the primary winding 38. Furthermore, as is shown in the figure, there are no circuit elements common to both the charging gate 32 and the output with the result that the power source 22 and the charging gate 32 are isolated from the capacitor 28 when load 24 is being pulsed. This degree of isolation is in contrast with the prior art, as was described earlier, wherein it was shown that power supplies of the prior art may not provide such complete isolation. Diode 36, which is conducting during the charging of capacitor 28, is open circuited (back biased by the output voltage) after a charging current pulse is terminated, thereby providing the dual functions of isolating the capacitor from the transformer 30 when load 24 is being pulsed, as well as preventing a discharge of the capacitor through the secondary winding 34.

A further advantage of the disclosed embodiment is that the controller 44, being on the low voltage side of the transformer 30, is conveniently fabricated as a solid state device. This results in a substantial savings in space, weight, and power consumption as compared to a high voltage electron discharge tube, as a tetrode, which would be utilized in a high voltage environment, as for example, a regulator utilizing a power source 22 of high voltage without a transformer wherein the capacitor 28 is charged directly from the power source 22.

The waveform of the output voltage presented to load 24 in a typical situation where load 24 is a TWT of a radar system is readily seen to be, for example, a fixed voltage of 10 kilovolts with a 1 percent ripple comprising a succession of substantially ramp waveforms. Thus, for example, if the TWT transmits a one microsecond pulse at intervals of 1 millisecond, the output voltage decays (a decreasing ramp) during the 1 microsecond and then remains essentially constant until the synchronizer 40 triggers the charging gate 32 to initiate a current pulse for recharging the capacitor 28. The capacitor then charges linearly with time, assuming the current pulse is of substantially constant amplitude, for a period of, for example, 30 microseconds at which time the predetermined value of voltage is reached, and in response thereto, the sensor 42 triggers the charging gate 32 to terminate the current pulse. The output voltage then remains essentially constant, clamped by diode 36 and isolated from the transformer 30 as well as the charging gate 32 and power source 22 until the arrival of the next external trigger 26 which pulses the load 24.

The synchronizer 40 comprises a delay network 48 delaying the external trigger 26, whereby the charging gate 32 is triggered after the pulsing of load 24 is completed. There is also provided an internal source, oscillator 50, for triggering the charging gate 32 in the absence of an external trigger 26 so that the output voltage can be raised to the predetermined value prior to the application of the external trigger 26. Thus, for example, in the case of a radar system wherein the external trigger 26 corresponds to a system trigger, oscillator 50 enables the regulator 20 to maintain a state of readiness with the output voltage at the predetermined value prior to the application of the radar system trigger. In addition, synchronizer 40 includes logic circuitry comprising gate 52 which is responsive to the external trigger 26, summing network 54, and gate 56 which is responsive to the sensor 42.

Gate 52 inhibits the internal triggers of oscillator 50 when, and only when, the external trigger 26 is present. Thus, summing network 54 sends to gate 56 either external triggers 26 suitably delayed by delay network 48 or, in their absence, the internal triggers provided by oscillator 50. Gate 56 is operated by sensor 42 to exclude all trigger pulses (external and internal) when the output voltage has the predetermined value so that there is no further charging of capacitor 28 until such time as the output voltage drops below the predetermined value.

The sensor 42 includes a voltage divider circuit comprising resistors 58 and 60 connected across the output of regulator 20, resistor 58 being much larger than resistor 60 so that the voltage developed across resistor 60 is of a suitably small value for amplifier 62 which is preferably a solid state operational amplifier. Amplifier 62 compares the voltage developed across resistor 60 with a reference voltage 64. Since the voltage developed across resistor 60 is a fixed fraction of the output voltage of regulator 20, amplifier 62 is thereby responsive to the output voltage of regulator 20. The value of reference voltage 64 with respect to ground 66 is preset, by means not shown, in accordance with the output voltage required by load 24. Amplifier 62 provides an output signal on line 68 which, due to the well-known high gain characteristic of operational amplifiers, swings to a relatively high or relatively low value of voltage depending on the difference between the voltage developed across resistor 60 and the reference voltage 64. With a typical solid state operational amplifier these two values of voltage appearing on line 68 would be, for example, plus and minus ten volts. The output signal on line 68 is applied directly to operate gate 56 as described above, and, in a similar manner operates generator 70 to initiate a trigger which causes multivibrator 46 to revert to the voltage state that turns controller 44 OFF. Thus, when the fraction of the output voltage appearing across resistor 60 rises above the reference voltage 64, controller 44 is turned OFF, and gate 56 is closed to exclude further external and internal triggers; and similarly when that voltage drops below the reference voltage 64, gate 56 opens to admit external and internal triggers, and generator 70 does not transmit a trigger to multivibrator 46.

Multivibrator 46 is furthermore utilized in initially charging capacitor 28 from a state of zero charge. As has been mentioned, the capacitor 28 receives an amount of energy from each current pulse of controller 44 sufficient to replenish the energy withdrawn from the capacitor 28 during a pulsing of the load 24. However, the energy withdrawn during a single pulsing of the load 24 is relatively small, typically, a few percent of the total energy stored in the capacitor 28. Accordingly, a succession of current pulses from controller 44 is utilized to charge capacitor 28 from a state of zero charge. In view of the fact that no trigger for turning OFF controller 44 is provided by generator 70 of the sensor 42 until the capacitor 28 has been charged to the predetermined output voltage, multivibrator 46 being monostable automatically reverts (for example, after a period of 100 microseconds) to the voltage state whereby controller 44 is turned OFF. Thus a succession of current pulses is provided without the aid of the sensor 42 until such time as the output voltage attains the predetermined value.

It is understood that the above described embodiment of the invention is illustrative only and that modifications thereof will occur to those skilled in the art. For example, controller 44 may employ a current regulating device such as a silicon controlled rectifier. Accordingly, it is desired that this invention is not to be limited to the embodiment disclosed herein but is to be limited only as defined by the appended claims.

I claim:

1. A power supply wherein a storage capacitor is connected in circuit with the secondary winding of a transformer, such supply being adapted to interconnect a power source with a load which may be pulsed by an external trigger and comprising:

switching means in circuit with the input winding of the transformer means for connection with the power source to generate a current pulse for charging the capacitor, the switching means including a monostable multivibrator;

synchronizing means, responsive to the external trigger, for operating the switching means to initiate the current pulse, the synchronizing means comprising a source of internal triggers, a gate responsive to the external trigger for inhibiting the internal trigger, means for delaying the external trigger, and means for coupling the internal trigger and the delayed external trigger to the multivibrator;

sensing means, responsive to the voltage across the capacitor, for operating the switching means when the voltage across the capacitor attains a predetermined value, said switch operation terminating the current pulse when the voltage across the capacitor attains the predetermined value; and the monostable multivibrator of the switching means being responsive to triggers of the synchronizing means for initiating the current pulse, the monostable multivibrator being further responsive to triggers of the sensing means for terminating the current pulse when the voltage across the capacitor attains the predetermined value.

2. The power supply of claim 1 wherein the switching means includes a current controller providing a current pulse of substantially uniform amplitude.

3. A power supply wherein a storage capacitor is connected in circuit with the secondary winding of a transformer, such supply being adapted to interconnect a power source with a load which may be pulsed by an external trigger and comprising:

switching means in circuit with the input winding of the transformer means for connection with the power source to generate a current pulse for charging the capacitor, the switching means including a monostable multivibrator and a current controller providing a current pulse of substantially uniform amplitude;

synchronizing means, responsive to the external trigger, for operating the switching means to initiate the current pulse; the synchronizing means comprising an oscillator supplying a succession of internal triggers, a gate responsive to the external trigger for inhibiting the internal trigger, means for delaying the external trigger, and means for coupling the internal trigger and the delayed external trigger to the multivibrator for operating the switching means to initiate corresponding current pulses in the absence of external triggers;

sensing means, responsive to the voltage across the capacitor, for operating the switching means to terminate the current pulse when the voltage across the capacitor attains a predetermined value; and the monostable multivibrator of the switching means being responsive to triggers of the synchronizing means for initiating the current pulse, the monostable multivibrator being further responsive to triggers of the sensing means for terminating the current pulse when the voltage across the capacitor attains the predetermined value.

4. The power supply of claim 3 wherein the synchronizing means includes gating means responsive to the sensing means for disengaging the synchronizing means from the switching means when the output voltage attains the predetermined value.

* * * * *